US008359306B2

(12) United States Patent
Kim (10) Patent No.: US 8,359,306 B2
(45) Date of Patent: Jan. 22, 2013

(54) INTELLIGENT AUTOMATIC RECOGNITION TOOLBAR SEARCH METHOD AND SYSTEM (76) Inventor: Soo-Hyun Kim, Buchun-shi (KR)

( * ) Notice: Subject to any disclaimer, the term of this patent is extended or adjusted under 35 U.S.C. 154(b) by 35 days.

(21) Appl. No.: 12/921,351

(22) PCT Filed: Apr. 7, 2009

(86) PCT No.: PCT/KR2009/001785
§ 371 (c)(1),
(2), (4) Date: Sep. 7, 2010

(87) PCT Pub. No.: WO2009/148216
PCT Pub. Date: Dec. 10, 2009

(65) Prior Publication Data
US 2011/0010357 A1 Jan. 13, 2011

(30) Foreign Application Priority Data
Jun. 4, 2008 (KR) .................. 10-2008-0052638

(51) Int. Cl.
G06F 7/00 (2006.01)
G06F 17/00 (2006.01)
(52) U.S. Cl. ........................ 707/708; 707/771
(58) Field of Classification Search .................. 707/708, 707/771
See application file for complete search history.

(56) References Cited

U.S. PATENT DOCUMENTS

| 5,913,215 | A  | * | 6/1999  | Rubinstein et al. ........... 707/708 |
| 7,216,290 | B2 | * | 5/2007  | Goldstein et al. ............. 715/234 |
| 7,529,766 | B2 | * | 5/2009  | Shilo et al. ............. 707/999.002 |
| 7,562,305 | B2 | * | 7/2009  | Need et al. ..................... 715/744 |
| 7,827,157 | B2 | * | 11/2010 | Shilo et al. .................... 707/695 |
| 7,827,191 | B2 | * | 11/2010 | Williams ....................... 707/776 |
| 7,870,109 | B2 | * | 1/2011  | Shilo et al. .................... 707/695 |
| 8,042,060 | B1 | * | 10/2011 | Djabarov et al. ............. 715/811 |
| 8,301,656 | B2 | * | 10/2012 | Taylor et al. .................. 707/771 |
| 2002/0194166 | A1 | * | 12/2002 | Fowler .............................. 707/3 |
| 2006/0190441 | A1 | * | 8/2006  | Gross et al. ....................... 707/3 |
| 2006/0282416 | A1 | * | 12/2006 | Gross et al. ....................... 707/3 |
| 2009/0007013 | A1 | * | 1/2009  | Shilo ............................. 715/826 |
| 2009/0144723 | A1 | * | 6/2009  | Hartin et al. .................. 717/173 |
| 2009/0150810 | A1 | * | 6/2009  | Burroughs et al. ........... 715/764 |

FOREIGN PATENT DOCUMENTS

KR 10-2004-0078632 9/2004
KR 10-2006-0001269 1/2006

* cited by examiner

Primary Examiner — James Trujillo
Assistant Examiner — Pavan Mamillapalli
(74) Attorney, Agent, or Firm — IPLA P.A.; James E. Bame (57) ABSTRACT An intelligent automatic recognition toolbar search method and system is provided. The method comprises the steps of: installing a toolbar in a user client's web browser or application program; recognizing a query term entered in the search window of the toolbar and registering information about search sites that search for the information on the query term; registering the search site as the basic search site; when the user client enters a query term in the search window and performs a search on the entered query term, performing the search on the entered query term using the query term of the basic search site and storing the search results; displaying the search results: and when the registered search site is displayed and a query term is entered in the search window in the web browser, extracting and searching for the query term entered in the search window of the search site as a query term of the toolbar.

15 Claims, 6 Drawing Sheets

INTELLIGENT AUTOMATIC RECOGNITION TOOLBAR SEARCH METHOD AND SYSTEM

TECHNICAL FIELD

The present invention relates to an intelligent automatic recognition toolbar search method and system in which while the system is displayed in the form of a toolbar in a client's web browser or application program, the client can search for and find all sorts of information within the toolbar, without neither being connected to a separate search site nor affecting the opened web page, by searching for query terms and displaying search results as lists in the toolbar.

BACKGROUND ART

In General, as the examples of a search method using a toolbar, there are included the following three search methods. First, a toolbar service has been used in which there exists a search window providing the same search result as that in a search service of each search service provider to the Internet users.

Also, second, some of professional search service providers produces and freely distribute their own separate search toolbars so that when a user downloads a relevant program and installs the downloaded program on a computer, a search tool is inserted on a web browser so as to allow the user to use a search service in which a web page provided by a relevant service provider is always opened.

In addition, third, a search method has been proposed in which a vast amount of information and a number of categories are simultaneously displayed as search results provided by a toolbar provider like search results provided on a general website.

The above-mentioned conventional prior arts encounter the following problems.

The problem of the firstly mentioned toolbar service resides in that since a search result after the search is displayed on a web page, a web page being used currently and the search result cannot be compared with each other simultaneously, or only a search result of a relevant search site is used.

The secondly mentioned search toolbar entails a problem in that a web page being opened must be hidden or closed in order to use the search information of a website providing a relevant program (i.e., search toolbar). That is, since a web page including the search information of a search service provider providing the program (i.e., search toolbar) is displayed, a user suffers from an inconvenience of not being able to compare the existing web page being displayed with the search result while viewing them together.

Further, the thirdly mentioned search toolbar involves a problem in that since a user easily does not select desired information due to a vast amount of information and a number of categories displayed on the web page on which the search result is displayed, he or she suffers from an inconvenience of having to viewing most of the displayed contents of a relevant website so as to select a desired search result after the search.

The information search has become merely a service in which a search engine providing information is provided focused on an unspecific majority of people due to the fact that the amount of search data is very enormous, and news, sites, web documents, image and the like are simultaneously displayed. Like this, the above-mentioned problems are involved when a user utilizes a toolbar search service very important in using the Internet,

SUMMARY OF THE INVENTION

Accordingly, it is an object of the present invention to provide an intelligent automatic recognition toolbar search method and system in which while the system is displayed in the form of a toolbar in a client's web browser or application program, the client can search for and find all sorts of information within the toolbar, without neither being connected to a separate search site nor affecting the opened web page, by searching for query terms and displaying search results as lists in the toolbar.

Another object of the present invention is to provide an intelligent automatic recognition toolbar search method and system in which when a query term is entered on a website being used by a user, it is automatically searched as a query term of a toolbar in a web browser or an application program so that search results for the query term can be read out even without inputting the relevant query term in a search window of the toolbar.

Yet another object of the present invention is to provide an intelligent automatic recognition toolbar search method and system in which the results searched in a toolbar of a web browser or an application program can be found by items of search contents such as websites, news, dictionaries, shopping, images and the like.

To accomplish the above objects, an intelligent automatic recognition toolbar search method according to the present invention comprises the steps of:

installing a toolbar in a user client's web browser or application program, wherein the toolbar comprises a search window in which query terms are entered and a search result display window that displays basic search content items as search results for the query terms and results corresponding to the search content items;

recognizing a query term entered in the search window of the toolbar and registering information about search sites that search for the information on the query term;

registering the search site used in performing a search on the query term as the basic search site among the registered search sites;

when the user client enters a query term in the search window and performs a search on the entered query term, performing the search on the entered query term using the query term of the basic search site and storing the search results which are divided into search content items and detailed results corresponding to the search content items;

displaying the search results in the search result display window; and when the registered search site is displayed and a query term is entered in the search window in the web browser, extracting and searching for the query term entered in the search window of the search site as a query term of the toolbar.

Preferably, the intelligent automatic recognition toolbar search method further comprises, when Korean and English URLs or Korean and English names are entered in an address window of a user client and a current webpage is moved to a relevant website, searching for the information entered in the address window using the basic search site, and extracting and searching for the titles of the search content items or the basic related words existing on a search result page as the query term of the toolbar.

In addition, the intelligent automatic recognition toolbar search system according to the present invention comprises:

a display management module for displaying a search window and a search result display window in the form of a toolbar at one side of a web browser or application program;

a search site configuring module for storing information on search sites searching for query terms entered in the search window of the toolbar, and when a user selects a representative search site searching for the query terms among the stored search sites, registering the selected representative search site as a basic search site.

a query term search module for searching for the query terms entered in the search window of the toolbar using query terms of the basic search site, and storing the search results for the query terms;

a search result output module for displaying the search results for the query terms searched by the query term search module at one side of the toolbar; and a search result selection module for checking if the search results stored by the query term search module are divided by relevant search content items, and storing the search results by the search content items, wherein the display management module further comprises a search content item selection window (14) for allowing the search results to be displayed by each search content item thereon.

According to the above construction of the present invention, since the intelligent automatic recognition toolbar search system allows query terms to be searched for and search results to be displayed as lists in the toolbar while being displayed in the form of a toolbar in a client's web browser or application program, the client can search for and find all sorts of information within the toolbar without being connected to a separate search site.

In addition, when a user enters a query term in the search window of a search site displayed on the web browser, the entered query term is automatically searched for as a query term of the toolbar of the web browser or application program, so that the search results can be found while the search results for the query term of the toolbar are compared with those of the search site of the web browser.

Further, the search results for a query term automatically recognized by the toolbar of the web browser or application program can be found by each search content item such as website, news, dictionary, shopping, image and the like.

DETAILED DESCRIPTION OF THE INVENTION

Now, embodiments of the present invention will be described hereinafter in detail with reference to the accompanying drawings.

Figure 1:
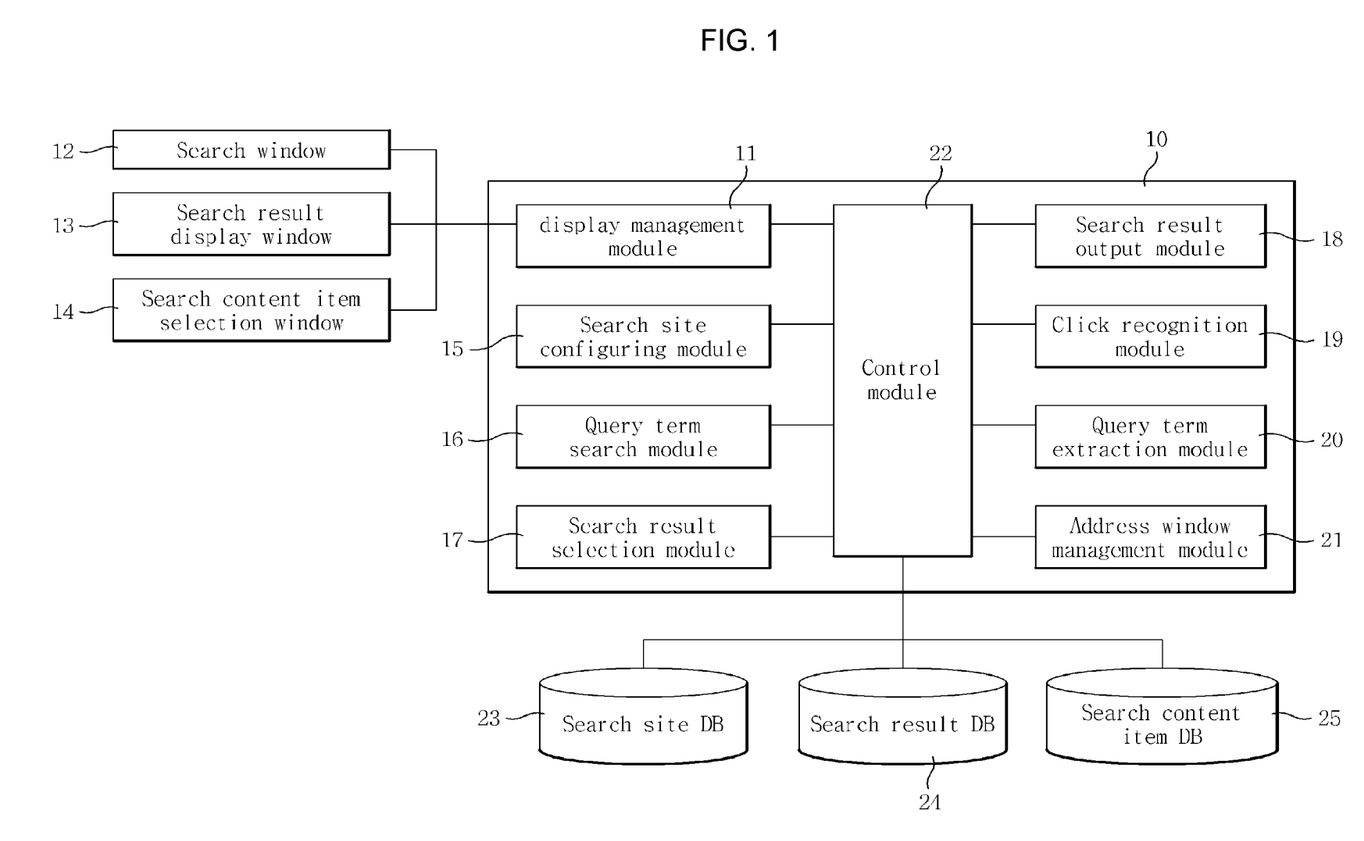
FIG. 1 is a block diagram illustrating an intelligent automatic recognition toolbar search system according to the present invention.

FIG. 1 is a block diagram illustrating an intelligent automatic recognition toolbar search system according to the present invention.

As shown in FIG. 1, the intelligent automatic recognition toolbar search system includes a display management module 11, a search site configuring module 15, a query term search module 16, a Search result selection module 17, a Search result output module 18, a click recognition module 19, a query term extraction module 20, and an address window management module 21.

The display management module 11 serves to display a search window 12 and a search result display window 13 in the form of a toolbar at one side of a web browser or application program. In this case, the search result display window 13 preferably includes a search content item selection window 14 for allowing the search results to be selected and found by each search content item therethrough.

The search site configuring module 15 serves to store information on search sites searching for query terms entered in the search window of the toolbar in a search site DB 23, and when a user selects a representative search site searching for the query terms among the search sites stored in the search site DB 23, register the selected representative search site as a basic search site. Such a search site may be a portal site such as Naver, Daum, Yahoo and the like or a professional search site such as a terminology search site and the like.

The query term search module 16 serves to search for the query terms entered in the search window of the toolbar using query terms of the basic search site, and storing the search results for the query terms in a search result DB 24.

The Search result selection module 17 serves to check if the search results stored in the search result DB 24 are divided by search content items, and storing the search results in a search content item DB 25 by dividing the search results into the search content items and detailed results corresponding to the search content items. In this case, the search results are preferably displayed together with a title of the searched site, an URL of a relevant search site, and additional information on the relevant search site.

Figure 5:
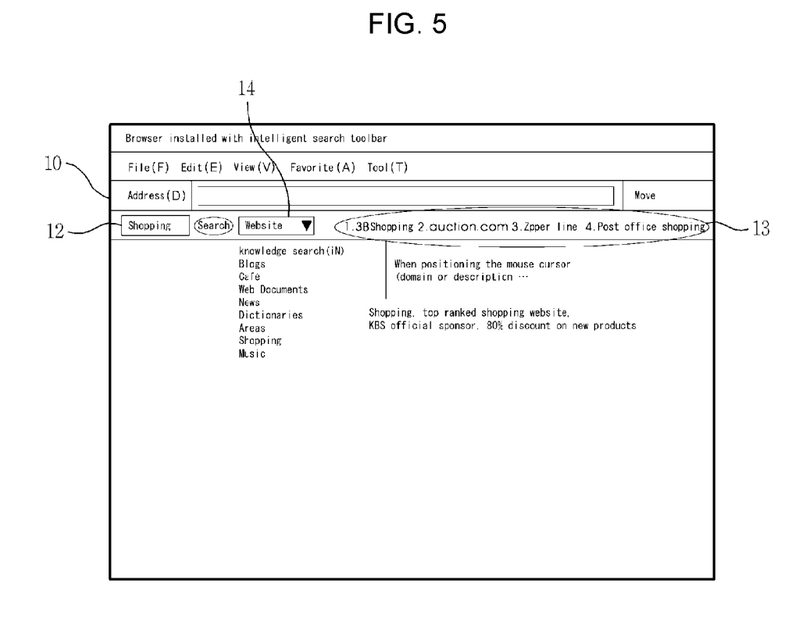
FIG. 5 is a screen illustrating a search process performed in association with an address window in a web browser in which a toolbar according to the present invention is installed.

The Search result output module 18 serves to display the search results for the query terms searched by the query term search module 16 on a search result display window 13 formed at one side of the toolbar. In the case where the search results are stored in the search content item DB 25, the search results are displayed by the search content items on the search result display window 13 prior to the search result DB 24. In this case, as shown in FIG. 5, preferably, when a mouse is positioned on a relevant title of the search results displayed on the search result display window 13, additional information on the relevant title is displayed.

The click recognition module 19 serves to, when the search results displayed on the search result display window 13 are clicked, recognize the click information and display a website of the clicked search results on the web browser.

Figure 6:
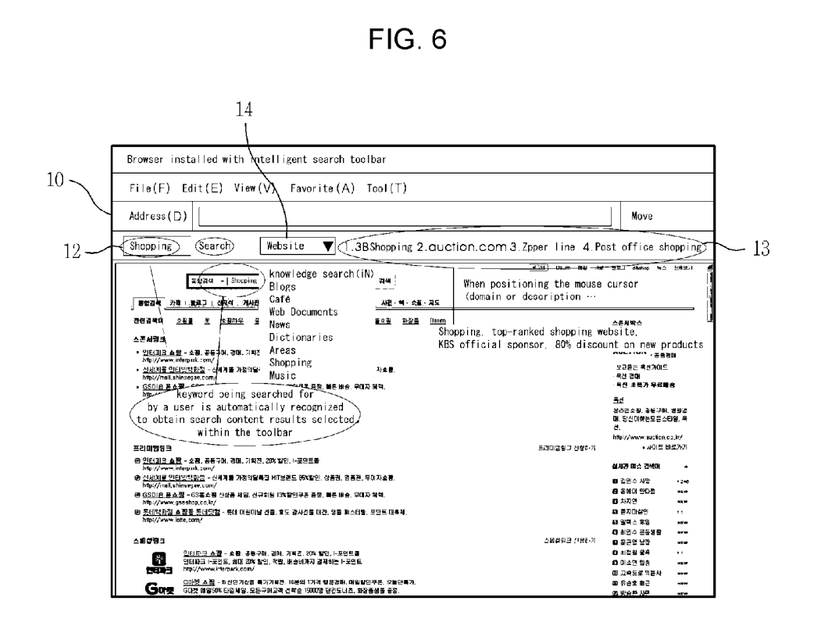
FIG. 6 is a screen illustrating a search process performed in association with a search site in a web browser in which an intelligent automatic recognition toolbar search system according to the present invention is installed.

The query term extraction module 20 serves to, when a query term is entered in the search window of the web browser, extract the entered query term as a query term of the toolbar, and provide the extracted query term to a query term search module 16. For example, as shown in FIG. 6, in the case where a screen of Daum, i.e., a portal site is displayed as a web page, when "shopping" is entered in the search window of Daum and a search is performed on the shopping, a search screen of Daum searched with "shopping" is displayed in the web browser, and simultaneously "shopping" is automatically entered in the search window of the toolbar. At this time, the search results of a basic search site selected for the shopping are displayed on the search result display window 13.

Figure 7:
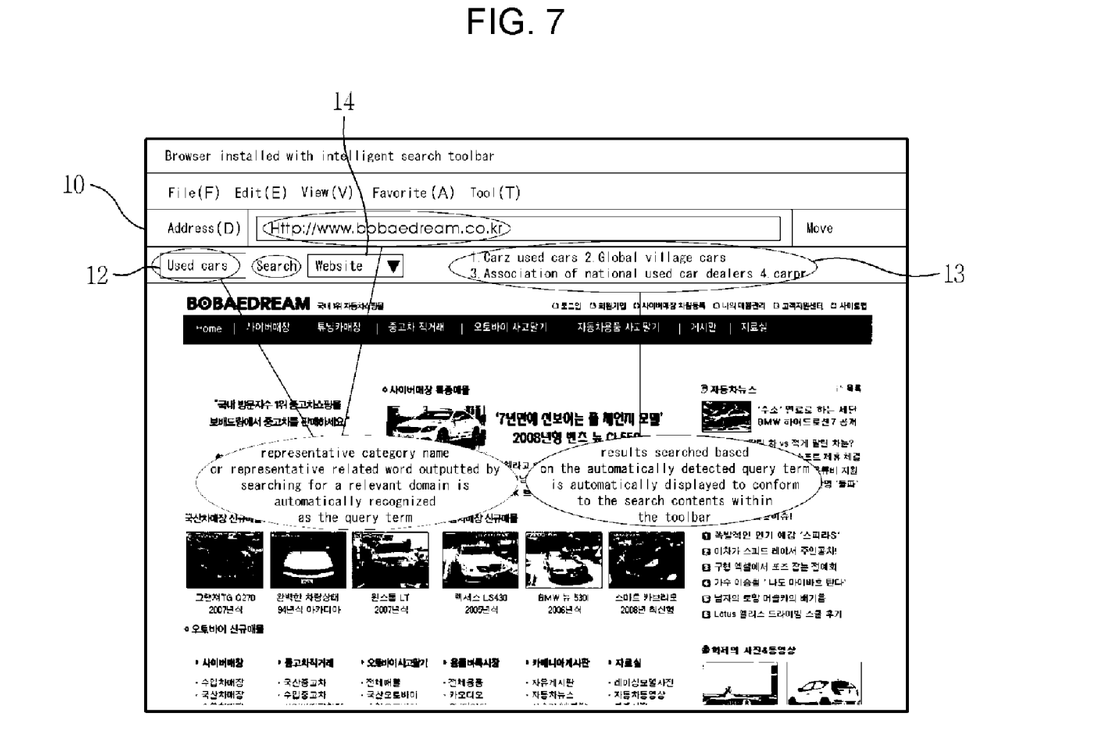
FIG. 7 is an exemplary screen illustrating search results outputted in association with an address window in a web browser in which an intelligent automatic recognition toolbar search system according to the present invention is installed.

The address window management module 21 serves to, when Korean and English URLs or Korean and English names are entered in an address window of a user client and a current webpage is moved to a relevant webpage, search for the information entered in the address window using the basic search site, extract the category name of a relevant website registered in a search engine or a related word provided on the searched web page as a query term of the toolbar, and provide the extracted query term to the query term search module 16. For example, as shown in FIG. 7, when a user enters "http://www.bobaedream.co.kr" in the address window to move a current webpage to a relevant webpage, "중고차 (used car)", which is the category name or the basic related word of the search results after "http://www.bobaedream.co.kr" is searched for as the query term of the basic search site, is again automatically entered as a query term of the toolbar and the search results for the query term is displayed on the search result display window 13.

Now, a search process using the search window of the toolbar will be described hereinafter in detail with reference to the flowchart of FIG. 2.

Figure 2:
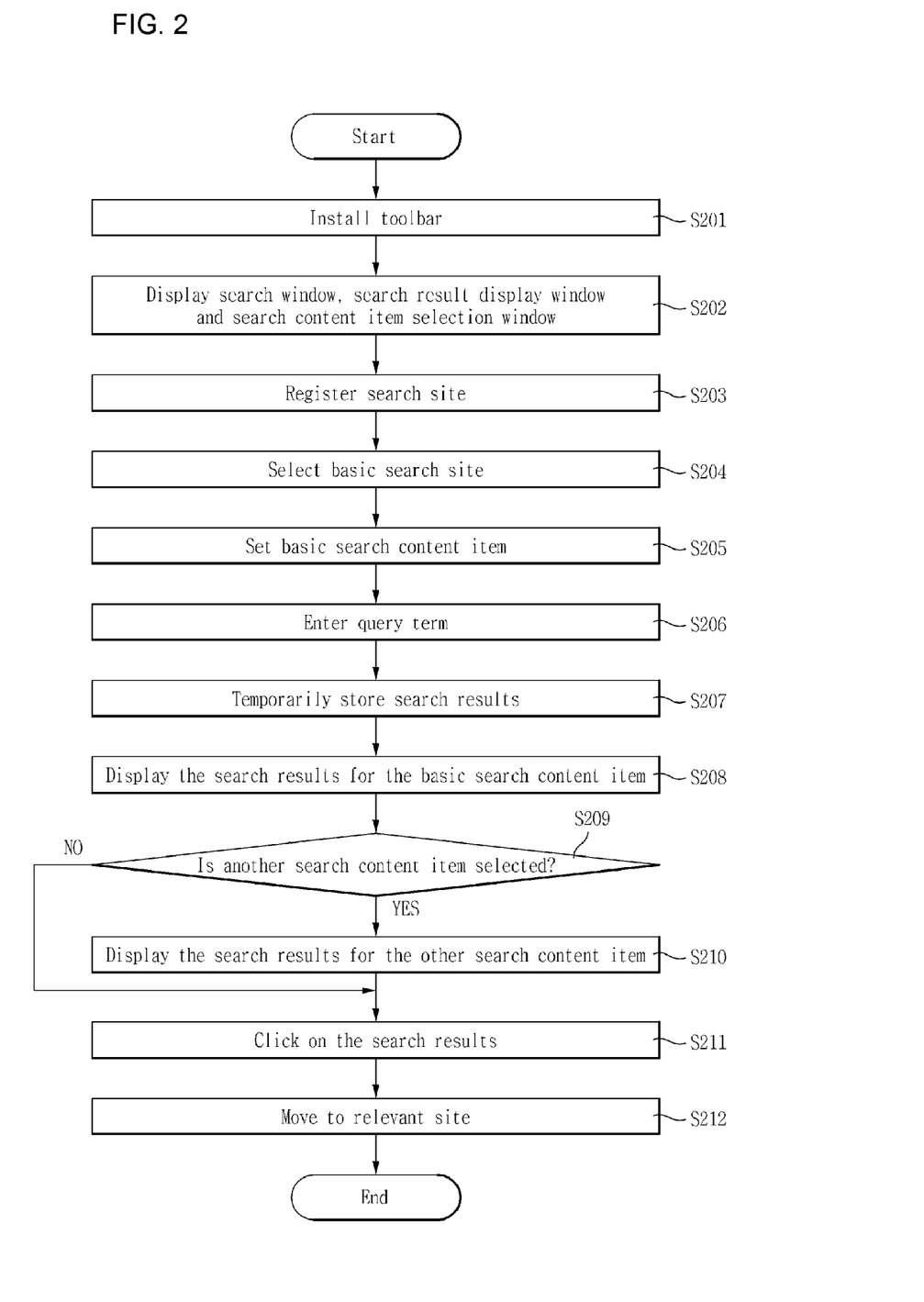
FIG. 2 is a flowchart illustrating a search process using a search window of a toolbar according to the present invention.

As shown in FIG. 2, first, a program for implementing the intelligent automatic recognition toolbar search system according to the present invention is downloaded on the Internet and is installed in a user client so that it is displayed as a toolbar 10 in the user client's web browser or application program (step S201). The toolbar 10 installed in the web browser basically includes a search window 12 and a search result display window 13 formed therein. The search window 12 functions to allow a user to enter a query term therein, and the search result display window 13 functions to display search results for the query term. Also, the toolbar 10 may additionally include a search content item selection window 14 for allowing the search results to be selected and found by each search content item therethrough (step S202).

A client user recognizes a query term entered in the search window 12 formed in the toolbar through the search site configuring module 15 and registers information on search sites searching for information on the query term (step S203). Such search sites may include a portal site such as Naver, Daum, Yahoo and the like or a professional search site such as a terminology search site and the like.

Thereafter, among the registered search sites, a search site used to search for a query term is selected as a basic search site (step S204). That is, in the case where users are general people, a portal site selected from Naver, Daum, Yahoo and the like may be selected as the basic search site. Also, in the case where users are experts, a professional terminology search site may be selected as the basic search site.

In the meantime, the search content item selection window 14 is set such that among the search content items provided as the search results of the search site, frequently used search content items and the detailed results corresponding to the search content items are displayed on the search content item selection window 14. For example, in the case of Naver as a portal site, any one of site, web document, knowledge iN, blog, café, image, moving picture, dictionary, news may be selected as the basic search content item. When the client user enters a query term in the search window 12 of the toolbar and then clicks on a search button (step S206), the query term search module 16 searches for the entered query term using the query term of the basic search site and temporarily stores the search results in the search result DB 24. In this case, the search results are divided into search content items and detailed results corresponding to the search content items.

Subsequently, the basic search content item selected by the client user is displayed on the search content item selection window 14 and information on detailed results corresponding to the basic search content item is displayed on the search result display window 13 (step S208). The search results displayed on the search result display window 13 are displayed as representative titles. When a mouse is positioned on the representative titles, additional information is displayed.

Meanwhile, in the case where the client user desires to find the search results of another search content item among the search results, when he or she selects the other search content item displayed on the search content item selection window 14 (step S209), the search results of the relevant search content item stored in the search result DB are displayed (step S210).

Then, in the case where the user desires to find the contents of the search results, when he or she clicks on the titles of the search results displayed on the search result display window 13 (step S211), a current webpage is moved to a web page of a relevant site linked to the search results (step S212).

Figure 3:
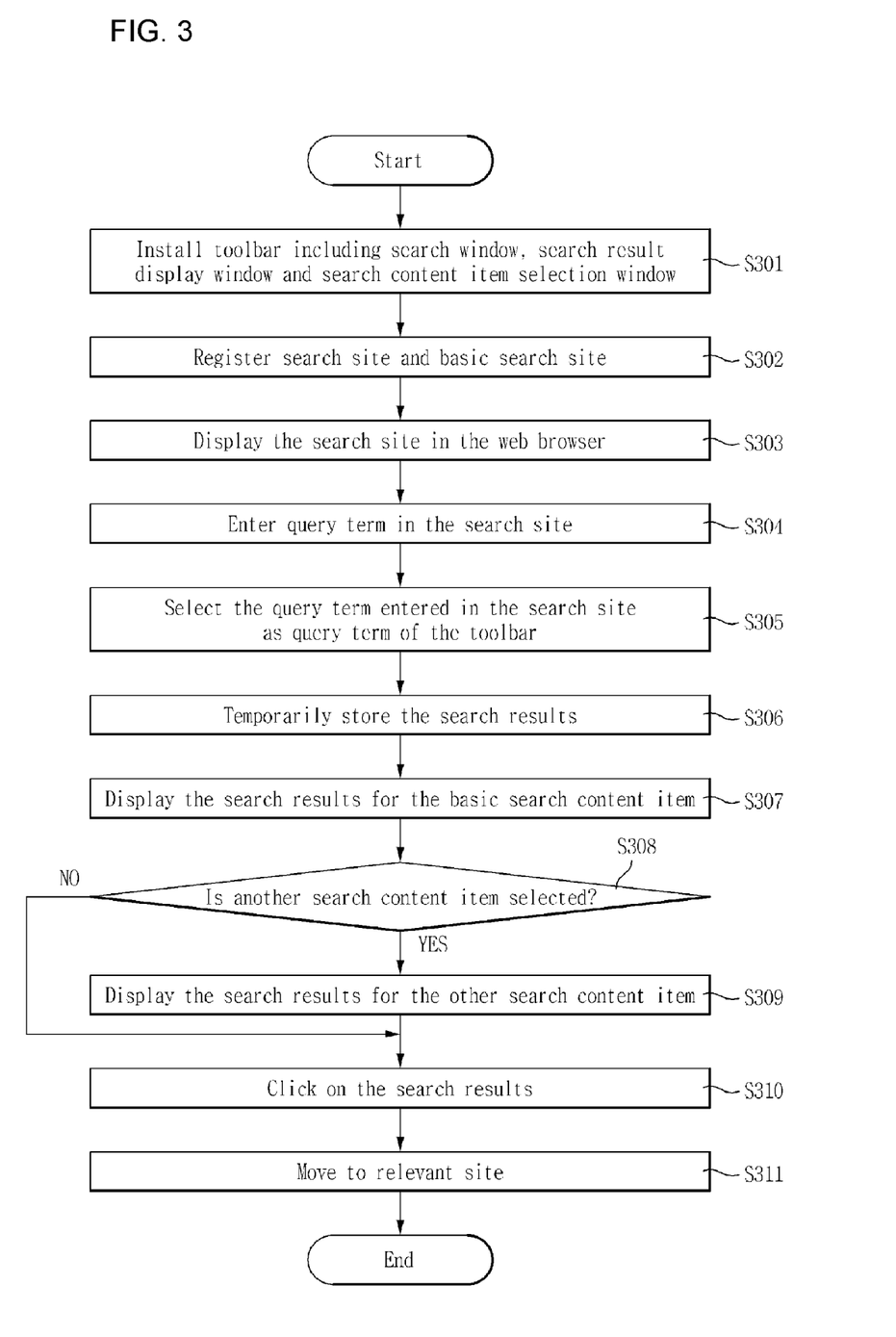
FIG. 3 is a flowchart illustrating a search process performed in association with a search site in a web browser in which a toolbar according to the present invention is installed.

Hereinafter, a search process performed in association with a search site of the toolbar in a web browser in which the intelligent automatic recognition toolbar search system according to the present invention is installed will be described in detail with reference to the flowchart of FIG. 3.

The intelligent automatic recognition toolbar search system according to the present invention is installed at one side of a user client's web browser so as form a search window 12 for allowing a user to enter a query term therein, a search result display window 13 for displaying search results for the query term and a search content item selection window 14 for to allowing the search results to be selected and found by each search content item therethrough (step S301).

Thereafter, among the registered search sites, a search site used in searching for a query term and a preferentially used basic search site are registered (step S302). Such a search site may include a portal site such as Naver, Daum, Yahoo and the like or a professional search site such as a terminology search site and the like.

A search site is displayed in the web browser (step S303). When a query term is entered in the displayed search site (step S303), the query term extraction module 20 extracts the query term entered in the search site of the web browser as a query term of the toolbar and provides the extracted query term to the query term search module 16 (step S305).

The query term search module 16 searches for the query term transmitted from the query term extraction module 20 as a query term of the toolbar and temporarily stores the search results in search result DB 24 (step S306). In this case, the search results are divided into search content items and detailed results corresponding to the search content items.

Subsequently, the basic search content item selected by the client user is displayed on the search content item selection window 14 and information on detailed results corresponding to the basic search content item is displayed on the search result display window 13 (step S307). Information on the search results displayed on the search result display window 13 is displayed as representative titles. When a mouse is positioned on the representative titles, additional information is displayed.

Meanwhile, in the case where the client user desires to find the search results of another search content item among the search results, when he or she selects the other search content item displayed on the search content item selection window 14 (step S308), the search results of the relevant search content item stored in the search result DB are displayed (step S309).

Then, in the case where the user desires to find the contents of the search results, when he or she clicks on the titles of the search results displayed on the search result display window 13 (step S310), a current webpage is moved to a web page of a relevant site linked to the search results (step S311).

Figure 4:
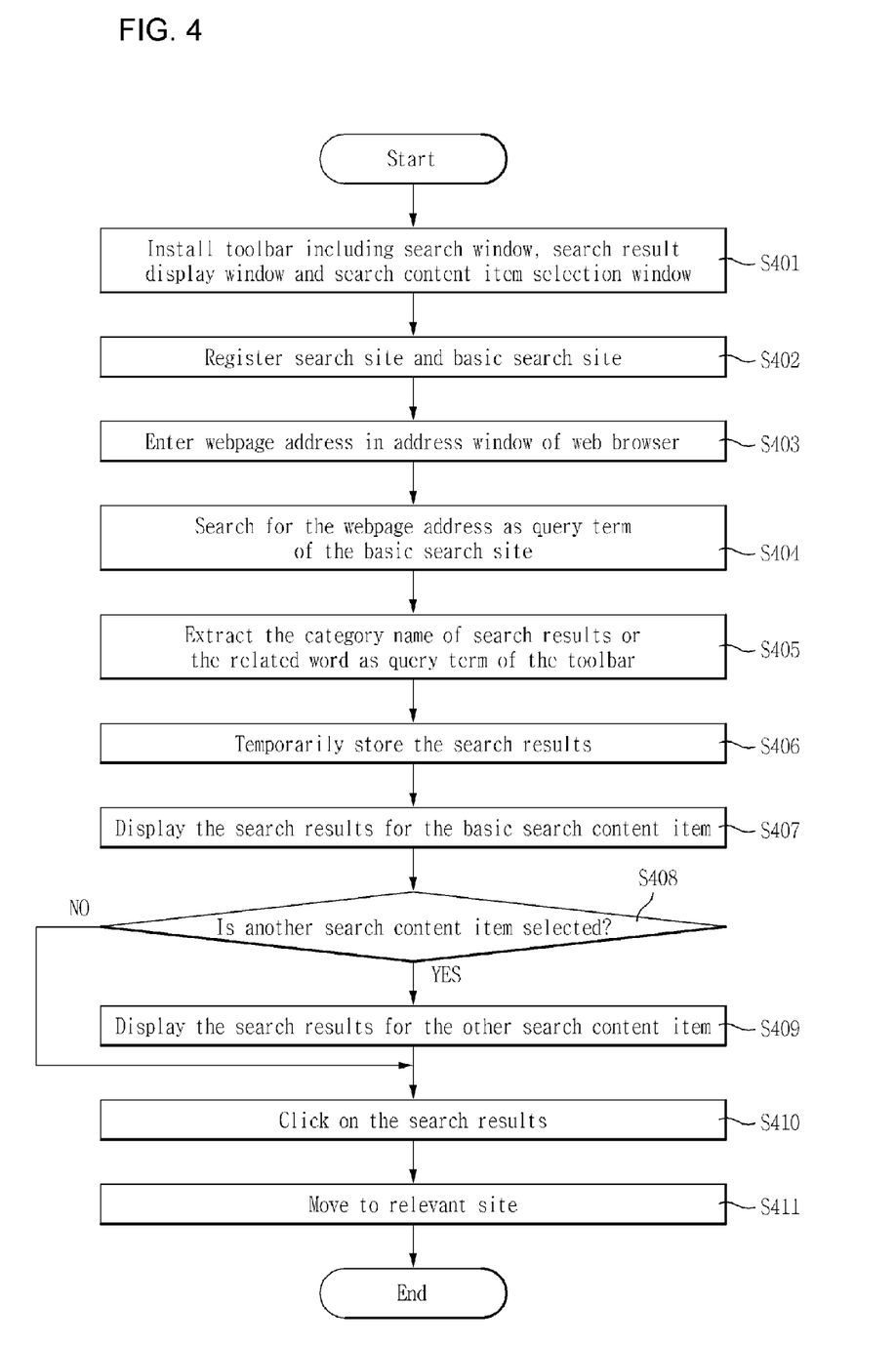
FIG. 4 is a flowchart illustrating a search process performed in association with a search site in a web browser in which an intelligent automatic recognition toolbar search system according to the present invention is installed.

Hereinafter, a search process performed in association with an address window of the toolbar in a web browser in which the intelligent automatic recognition toolbar search system according to the present invention is installed will be described in detail with reference to the flowchart of FIG. 4.

The intelligent automatic recognition toolbar search system according to the present invention is installed at one side of a user client's web browser so as to form a search window 12 for allowing a user to enter a query term therein, a search result display window 13 for displaying search results for the query term and a search content item selection window 14 for allowing the search results to be selected and found by each search content item therethrough (step S401).

Thereafter, among the registered search sites, a search site used in searching for a query term and a preferentially used basic search site are registered (step S402). Such a search site may include a portal site such as Naver, Daum, Yahoo and the like or a professional search site such as a terminology search site and the like.

When Korean and English URLs or Korean and English names are entered in an address window of a user client and a current website is moved to a relevant website (step S403), the information entered in the address window is searched for as a query term of the basic search site (step S404), and a term corresponding to the category name of a relevant website or a related word provided on the search site is extracted as a query term of the toolbar and is provided to the query term search module 16 (step S405).

The query term search module 16 searches for the query term transmitted from the query term extraction module 20 as a query term of the toolbar and temporarily stores the search results in search result DB 24 (step S406). In this case, the search results are divided into search content items and detailed results corresponding to the search content items.

Subsequently, the basic search content item selected by the client user is displayed on the search content item selection window 14 and information on detailed results corresponding to the basic search content item is displayed on the search result display window 13 (step S407). Information on the search results displayed on the search result display window 13 is displayed as representative titles. When a mouse is positioned on the representative titles, additional information is displayed.

Meanwhile, in the case where the client user desires to find the search results of another search content item among the search results, when he or she selects the other search content item displayed on the search content item selection window 14 (step S408), the search results of the relevant search content item stored in the search result DB are displayed (step S409).

Then, in the case where the user desires to find the contents of the search results, when he or she clicks on the titles of the search results displayed on the search result display window 13 (step S410), a current webpage is moved to a web page of a relevant site linked to the search results (step S411).

While the present invention has been described with reference to the particular illustrative embodiments and the drawings, it is not to be restricted by the embodiments but only by the appended claims. It is to be appreciated that those skilled in the art can change or modify the embodiments within the equivalent scope of the appended claims without departing from the scope and spirit of the present invention.

What is claimed is:

1. An intelligent automatic recognition toolbar search method comprising steps of:
installing a toolbar in a user client's web browser or application program, wherein the toolbar comprises a search window in which query terms are entered and a search result display window that displays basic search content items as search results for the query terms entered in the search window of the toolbar and results corresponding to the search content items;
recognizing a query term entered in the search window of the toolbar and registering information about search sites that search for the information on the query term;
registering the search site used in performing a search on the query term as the basic search site among the registered search sites;
when the user client enters a query term in the search window and performs a search on the entered query term, performing the search on the entered query term using the query term of the basic search site and storing the search results which are divided into search content items and detailed results corresponding to the search content items;
displaying the search results in the search result display window in the toolbar; and
when the registered search site is displayed and a query term is entered in the search window in the web browser, extracting and searching for the query term entered in the search window of the search site as a query term of the toolbar,
further comprising a step of, when Korean and English URLs or Korean and English names are entered in an address window of a user client and a current website is moved to a relevant website, searching for the information entered in the address window as a query term of the basic search site, producing and storing automatic search results, displaying the automatic search results in the search result display window in the toolbar, extracting and searching for the category name of a relevant website or a basic related word existing on the automatic search results, and using the category name or the basic related word extracted from the automatic search results as new inputs to the search window of the toolbar.

2. The intelligent automatic recognition toolbar search method according to claim 1, further comprising a step of, when a mouse is positioned on the search results displayed on the search result display window, displaying additional information.

3. The intelligent automatic recognition toolbar search method according to claim 1, further comprising a step of, when the search results displayed on the search result display window is clicked, displaying the URL of relevant search results as a webpage.

4. The intelligent automatic recognition toolbar search method according to claim 1, further comprising a step of, when another search content item displayed on a search content item selection window is selected, displaying the search results of the other search content item stored in a search result DB.

5. The intelligent automatic recognition toolbar search method according to claim 1, further comprising a step of, when a mouse is positioned on the search results displayed on the search result display window, displaying additional information.

6. The intelligent automatic recognition toolbar search method according to claim 1, further comprising a step of, when the search results displayed on the search result display window is clicked, displaying the URL of relevant search results as a webpage.

7. The intelligent automatic recognition toolbar search method according to claim 1, further comprising a step of, when another search content item displayed on a search content item selection window is selected, displaying the search results of the other search content item stored in a search result DB.

8. A non-transitory computer readable medium encoded with an intelligent automatic recognition toolbar search system comprising:
   a display management module for displaying a search window and a search result display window in the form of a toolbar at one side of a web browser or application program;
   a search site configuring module for storing information on search sites searching for query terms entered in the search window of the toolbar, and when a user selects a representative search site searching for the query terms among the stored search sites, registering the selected representative search site as a basic search site;
   a query term search module for searching for the query terms entered in the search window of the toolbar using query terms of the basic search site, and storing the search results for the query terms;
   a search result output module for displaying the search results for the query terms searched by the query term search module at one side of the toolbar; and
   a Search result selection module for checking if the search results stored by the query term search module are divided by relevant search content items, and storing the search results by the search content items, wherein the display management module further comprises a search content item selection window for allowing the search results to be displayed by each search content item thereon,
   further comprising an address window management module for, when Korean and English URLs or Korean and English names are entered in an address window of a user client and a current website is moved to a relevant website, searching for the information entered in the address window as a query term of the basic search site, producing and storing automatic search results, extracting the category name of a relevant web site or a representative related word existing on the automatic search results and using the category name or the basic related word extracted from the automatic search results as new inputs to the search window of the query term search module.

9. The non-transitory computer readable medium according to claim 8, further comprising a query term extraction module for, when a query term is entered in the search window of the web browser in the case of a toolbar of a search site, extracting the entered query term as a query term of the toolbar and providing the extracted query term to a query term search module.

10. The non-transitory computer readable medium according to any one of claim 9, wherein the search result output module displays additional information when a mouse is positioned on the search results displayed on the search result display window.

11. The non-transitory computer readable medium according to claim 9, further comprising a click recognition module for, when the search results displayed on the search result display window are clicked, recognizing the click information and displaying a website of the clicked search results on the web browser.

12. The non-transitory computer readable medium according to claim 8, wherein the search result output module displays additional information when a mouse is positioned on the search results displayed on the search result display window.

13. The non-transitory computer readable medium according to claim 8, further comprising a click recognition module for, when the search results displayed on the search result display window are clicked, recognizing the click information and displaying a website of the clicked search results on the web browser.

14. The non-transitory computer readable medium according to any one of claim 8, wherein the search result output module displays additional information when a mouse is positioned on the search results displayed on the search result display window.

15. The non-transitory computer readable medium according to claim 8, further comprising a click recognition module for, when the search results displayed on the search result display window are clicked, recognizing the click information and displaying a website of the clicked search results on the web browser.

\* \* \* \* \*